United States Patent [19]

Urlik

[11] Patent Number: 5,226,610
[45] Date of Patent: Jul. 13, 1993

[54] MOTION PICTURE FILM SHIPPING AND HANDLING MEANS

[76] Inventor: Randall G. Urlik, 7990 S. Clayton St., Littleton, Colo. 80122

[21] Appl. No.: 742,011

[22] Filed: Aug. 8, 1991

Related U.S. Application Data

[63] Continuation-in-part of Ser. No. 715,684, Jun. 14, 1991, which is a continuation-in-part of Ser. No. 641,298, Apr. 30, 1991, Pat. No. 5,174,516, which is a continuation-in-part of Ser. No. 584,793, Sep. 19, 1990, Pat. No. 5,174,517.

[51] Int. Cl.$^5$ .................................. B65H 16/04
[52] U.S. Cl. ........................... 242/55.18; 242/71.8; 206/398; 206/406
[58] Field of Search ............ 242/55.18, 55.19 R, 242/55.19 A, 71.8, 77, 77.3, 77.4, 115, 116, 118.4, 118.6, 118.8, 71, 71.1, 71.9; 352/126, 128; 206/398, 402, 404, 406, 408

[56] References Cited

U.S. PATENT DOCUMENTS

| | | | |
|---|---|---|---|
| 1,371,786 | 3/1921 | Hummell et al. | 242/71.8 |
| 1,823,245 | 9/1931 | Witzel | 242/55.18 |
| 2,327,108 | 8/1943 | Heyer | 242/55.19 A |
| 2,475,036 | 7/1949 | Lopez-Henriquez | 242/55.18 |
| 2,546,146 | 3/1951 | Popoli | 242/71.8 |
| 2,703,684 | 3/1955 | Warfield | 242/72 R |
| 2,846,219 | 8/1958 | Matheson | 242/55.18 |
| 3,340,997 | 9/1967 | McCreary et al. | 206/404 |
| 3,353,660 | 11/1967 | Will | 206/406 |
| 3,369,654 | 2/1968 | Burgess | 206/406 |
| 3,620,475 | 11/1971 | Penn | 242/71.1 X |
| 3,780,959 | 12/1973 | Burth | 242/55.18 |
| 3,823,890 | 7/1974 | Potts | 242/55.18 |
| 3,883,087 | 5/1975 | Van Praag | 242/71.8 |
| 3,993,260 | 11/1976 | Bauer, Sr. | 242/55.18 |
| 4,010,910 | 3/1977 | Boudouris et al. | 242/55.18 |
| 4,030,675 | 6/1977 | Eissfeldt | 242/55.18 |
| 4,033,523 | 7/1977 | Roman | 242/71.1 X |
| 4,169,566 | 10/1979 | Boudouris et al. | 242/55.18 |
| 4,240,593 | 12/1980 | Bell et al. | 242/71.8 |
| 4,629,140 | 12/1986 | LaCasse | 242/71.8 |
| 4,676,370 | 6/1987 | Rudick | 206/404 X |
| 4,744,528 | 5/1988 | Winters | 242/71.8 |
| 4,754,878 | 7/1988 | Bose | 242/71.8 X |
| 4,949,912 | 8/1990 | Bose et al. | 242/55.18 X |

Primary Examiner—Daniel P. Stodola
Assistant Examiner—John P. Darling
Attorney, Agent, or Firm—Terry M. Gernstein

[57] ABSTRACT

A motion picture film shipping and handling case unit is adapted to be used in conjunction with a motion picture film that is supported on a flange, [such as a flange and hub unit as defined in U.S. patent applications Ser. Nos. 07/715,684, 07/641,298 and 07/584,793,] or which is supported only on a hub, including a hub unit such as disclosed in these three patent applications. The case unit includes a film packing elements and hub engaging elements as well as releasable fastener that engage the hub and releasably attach the hub to the case. The case includes a lap joint and special film supporting straps can be used to attach the film to the case unit if no flange is used.

20 Claims, 6 Drawing Sheets

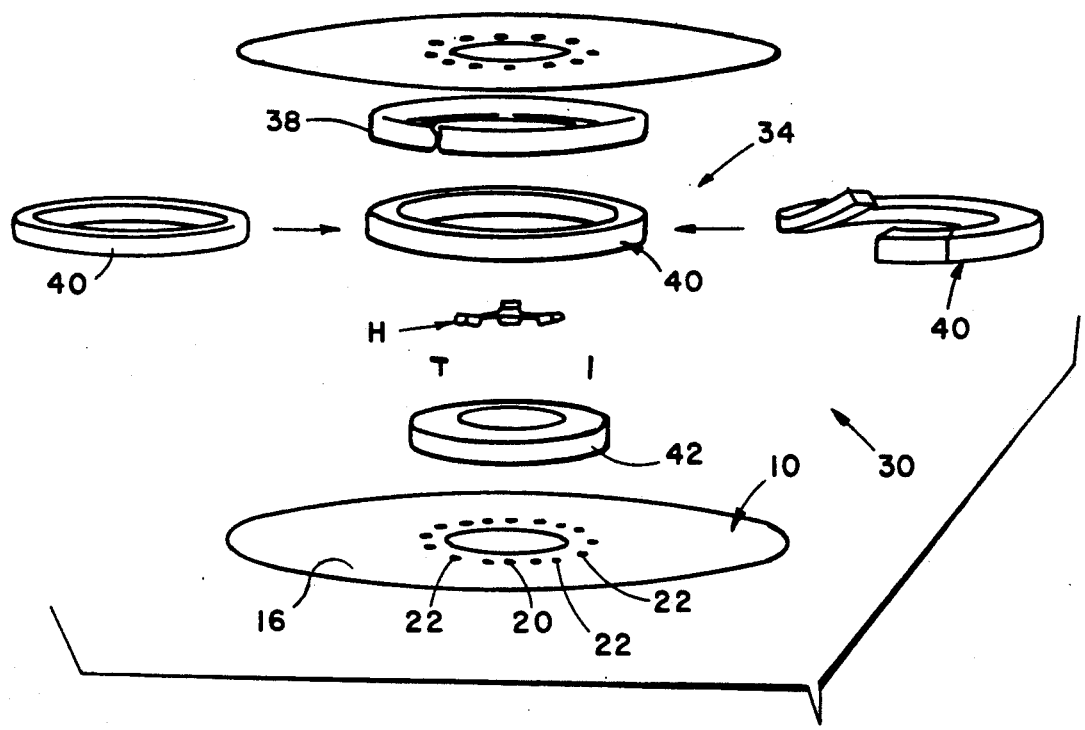
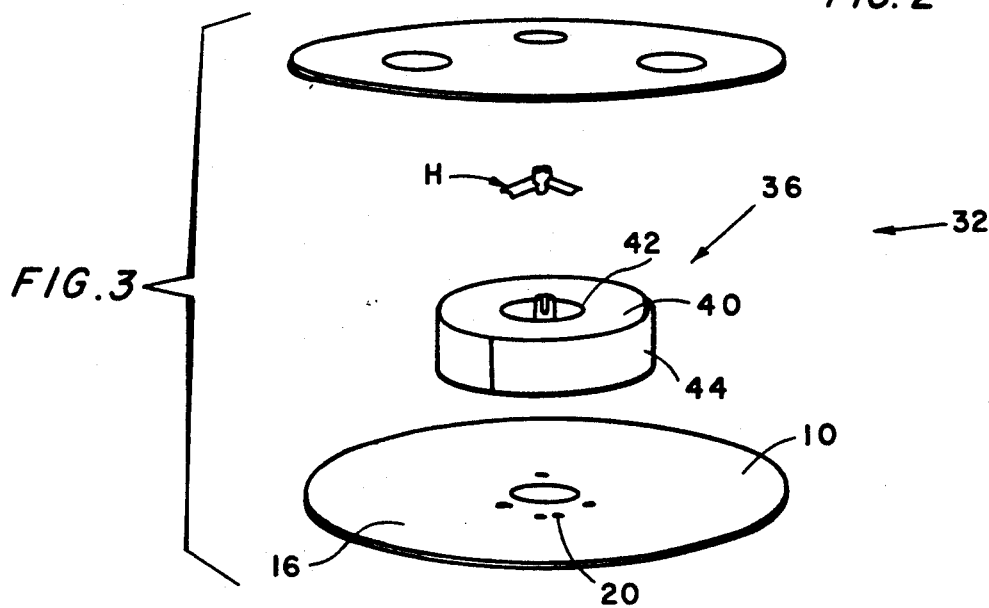

MOTION PICTURE FILM SHIPPING AND HANDLING MEANS

The present application is a continuation-in-part of patent application U.S. Ser. No. 07/715,684, filed on Jun. 14, 1991 (hereinafter referred to as the parent application) which was a continuation-in-part of U.S. Ser. No. 07/641,298, filed on Apr. 30, 1991 (hereinafter referred to as the grandparent application), now U.S. Pat. No. 5,174,516, which was a continuation-in-part of patent application Ser. No. 07/584,793, filed on Sep. 19, 1990 (hereinafter referred to as the great-grandparent application), now U.S. Pat. No. 5,174,517. The disclosures of each of these documents are incorporated herein by reference.

TECHNICAL FIELD OF THE INVENTION

The present invention relates to the general art of winding and reeling, and to the particular field of motion picture film handling systems.

BACKGROUND OF THE INVENTION

Modern movie films are generally manufactured in one location and shipped to various distributors located throughout the world. These distributors then move the films to various theaters with whom they are associated. This distribution system has been in place for many years, and has worked well.

However, recent changes in movie film formats as well as theater format have placed a strain on this system. For example, modern films can be in a variety of formats and can be any length including 12,000 feet or longer. Such movie films can weigh 40 or more pounds, and can be easily damaged by improper handling.

The devices disclosed in the incorporated documents overcome this problem by providing means for shipping an entire movie film in one container. In this manner, only minimal splicing may be required. The film is simply removed from the container and placed on the appropriate projection equipment.

While this is efficient, there are some movie theater personnel that do not wish to carry a full film around. Some people may feel that carrying a full film is too cumbersome.

Therefore, there is a need for a motion picture film shipping and handling unit that combines the advantages of the devices disclosed in the incorporated documents while still permitting a user to carry and move a motion picture film in sections.

Still further, many modern theaters are complexes of a plurality of individual movie theaters. Several movies may be run in these complexes, and one feature film also may be shown in several theaters of one complex. This can create several problems. For example, moving a heavy film from one place to another may subject that film and its supporting elements to physical abuse or damage. The film supporting system also can be damaged in this process. Such damage may delay the showing of the film to permit repairing the film or to permit repairing or replacing the handling system. Sometimes, damage to, or loss of, one element of the handling system requires replacing the entire handling system. This can cause extra expense and aggravation for an exhibitor.

The motion picture film shipping and handling means disclosed in the parent, grandparent and great-grandparent patent applications referred to above are amenable to use with films of all lengths, including full length feature films, and protect the film and the film handling system from damage. These film shipping and handling means also make handling of a motion picture film easier than prior means.

As mentioned above, since the weight of a feature length motion picture film can be so great, further improvement in a film shipping and handling means disclosed in the incorporated documents can be made by making such means lighter and easier to handle. Still further improvement can be achieved by making the shipping and handling means more versatile. This increased versatility can be obtained by making the shipping and handling means amenable to use with films stored on a flange or films that are not on such a flange. Further improvement can be achieve by storing the film in a manner that permits a portion of the storage container to be interchanged and used for a variety of purposes, including further storage functions.

Therefore, the motion picture film shipping and handling units disclosed in the incorporated documents can be further improved by providing them with means for using some of the elements thereof in a plurality of shipping and handling functions.

Still further improvement can be achieved by ensuring that a closed shipping container is easy to handle and, once closed, will be sealed in a secure manner. This will ensure that the film will remain in the closed container during shipping and handling.

Therefore, there is a need for further improvement in the motion picture film shipping and handling means disclosed in the parent, grandparent and great-grandparent patent applications.

OBJECTS OF THE INVENTION

It is a main object of the present invention is to further improve the motion picture film shipping and handling means disclosed in the parent, grandparent and great-grandparent patent applications.

It is another object of the present invention to provide a motion picture film shipping and handling means that is light in weight, yet is secure in its storage and protection of motion picture films located therein.

It is another object of the present invention to provide a motion picture film shipping and handling means that is versatile enough to contain and securely protect a motion picture film stored therein on a flange or stored therein without a flange.

It is another object of the present invention to provide a motion picture film shipping and handling means that is easy to carry.

It is another object of the present invention to provide a motion picture film shipping and handling means that can accommodate a full motion picture film in a manner that still makes carrying the motion picture film easy.

It is another object of the present invention to provide a motion picture film shipping and handling means that can accommodate a full motion picture film in a manner that still makes carrying the motion picture film easy, while still being amenable to use with motion picture mounting means that can be used on a variety of different projection systems.

It is another object of the present invention to provide a motion picture film shipping and handling means that is amenable to use in conjunction with the hubs and flanges disclosed in the parent, grandparent and great-grandparent applications.

SUMMARY OF THE INVENTION

These, and other, objects are achieved by a motion picture film shipping and handling means case unit that can securely contain a full length motion picture film that has been stored on a flange system, such as disclosed in the parent, grandparent and/or the great-grandparent patent applications, or that is contained in the case unit without any flange unit. The case unit has means for securely closing that case unit and maintaining that case unit closed during shipping and handling. The shipping and handling means of the present disclosure includes means for securing the film to the case unit sections so the sections can be separated from each other and moved as required with the film portions secured thereto. This feature permits a heavy film to be carried about in two sections.

In this manner, a person is not required to carry an entire motion picture film—only one part thereof. This will reduce the weight of any particular portion being moved, including a film and portion of the case unit being carried, from prior systems, including the systems disclosed in the incorporated documents. However, even though the weight of the present system may be reduced as compared to prior carrying cases, the case unit of the present invention includes means for ensuring that the container, once closed, will remain securely closed, and the motion picture film will remain securely in place in the case unit.

Still further, the container system of the present invention also includes a handle unit that makes handling of the container easy.

BRIEF DESCRIPTION OF THE DRAWING FIGURES

FIG. 2 is an exploded perspective view of the reel portion of a film shipping and handling unit disclosed in the incorporated documents.

FIG. 3 is an exploded perspective view of the reel portion of a film shipping and handling unit disclosed in the incorporated documents.

DETAILED DESCRIPTION OF THE PREFERRED EMBODIMENT OF THE INVENTION

Figure 1:
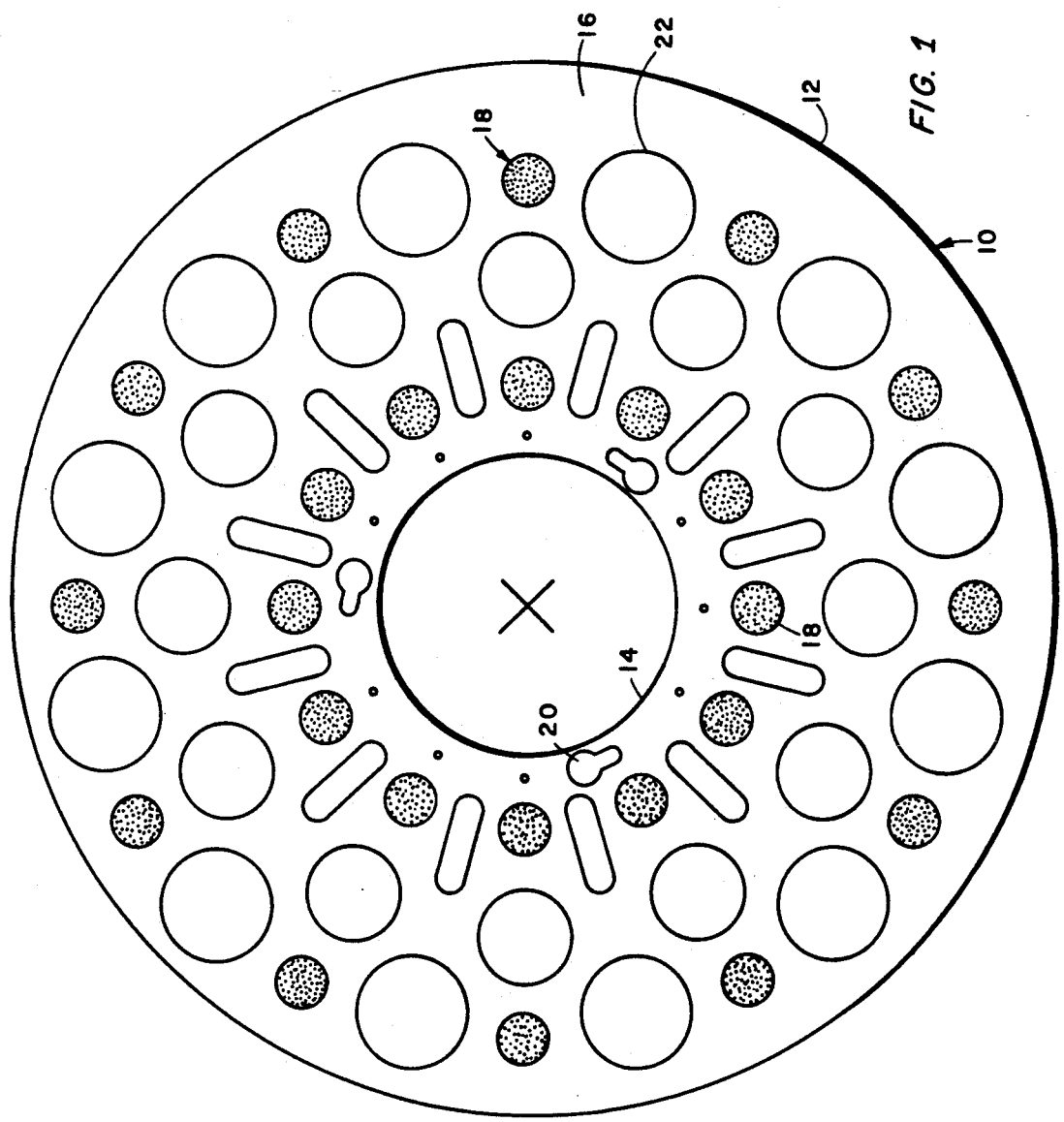
FIG. 1 illustrates a flange as used in the film shipping and handling systems disclosed in the incorporated documents.

Shown in FIG. 1 is a flange 10 that is associated with motion picture film and is used to mount motion picture film. The flange 10 is fully disclosed in the incorporated documents, and thus will only be briefly discussed herein. As discussed in the incorporated documents, the flange 10 is annular and includes a circular outer peripheral edge 12 having an outer diameter, an inner circular peripheral edge 14 having an inner diameter, and a wall 16 therebetween. A multiplicity of pads 18 are fixed to the wall 16 on one surface of that wall, with the other surface of the wall 16 being plain and free of such pads. The pads are used to cushion the flange. The wall 16 further includes a plurality of locking fastener receiving holes, such as hole 20, and a further plurality of cutouts, such as cutout 22 defined therethrough. The flange can be formed of metal or plastic or other suitable material, and serves to support and protect the motion picture film.

As shown in FIGS. 2 and 3, the flange 10 is used in conjunction with film handling systems 30 and 32 respectively. The film handling systems are fully disclosed in the incorporated documents, and thus will not be discussed in detail. However, it is seen in these figures that the film handling systems include collapsible hubs 34 or 36. The hub 34 includes a film winding band 38 to which motion picture film is attached and which surrounds a removable packing ring 40. The packing ring, in turn, surrounds a main winding hub 42. The system 32 includes a film winding ring 44 surrounding a packing ring and a shipping ring as discussed in the incorporated documents. Both hubs are releasably attached to the film-supporting flanges as discussed in the incorporated documents. Either of the hubs can be attached to a platter-type projection system or can include a spindle-attaching element for attaching the hub to a spindle-type projection system.

Figure 4:
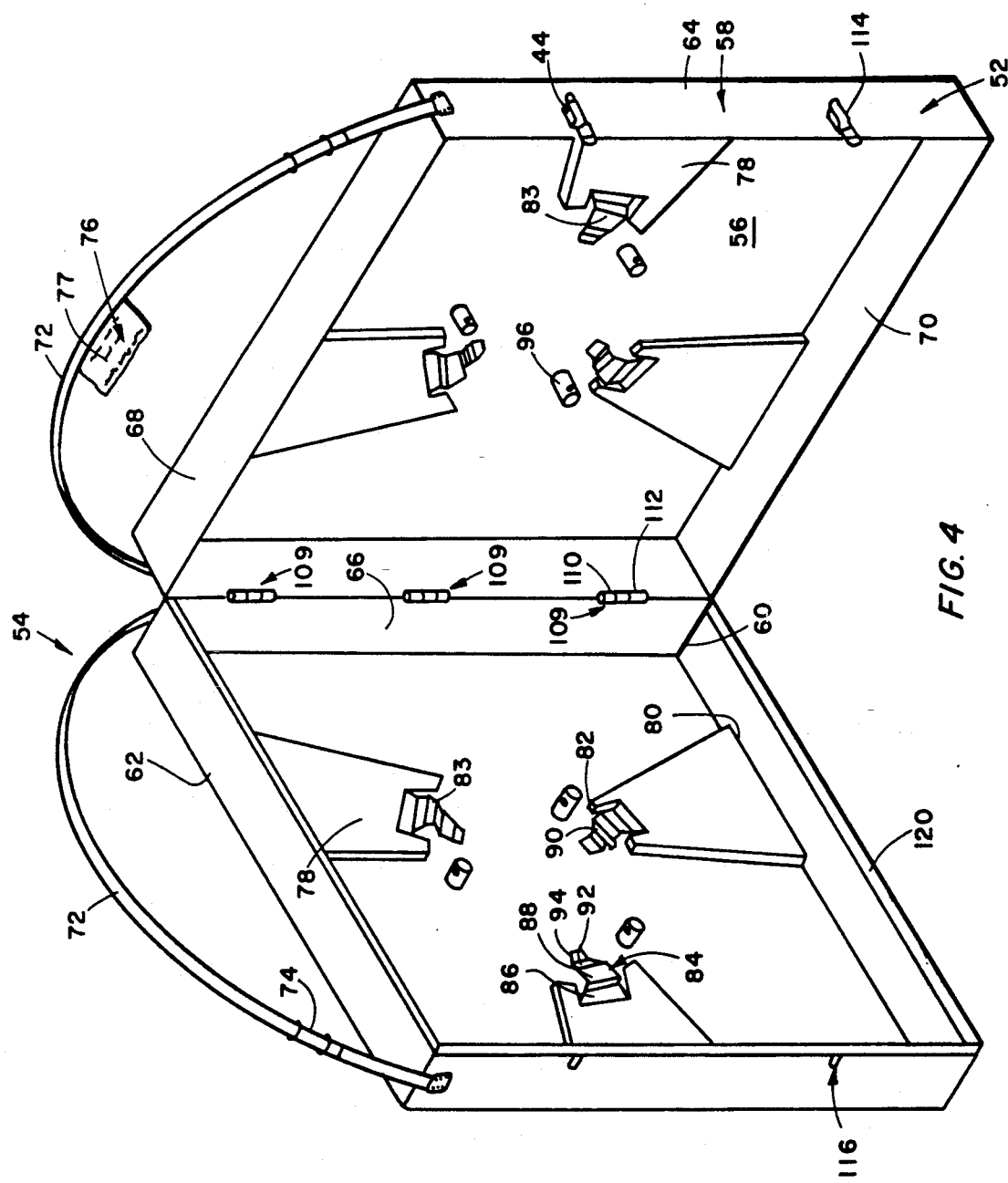
FIG. 4 is a perspective view of a shipping and handling case unit of the present invention in the partially open condition.
Figure 5:
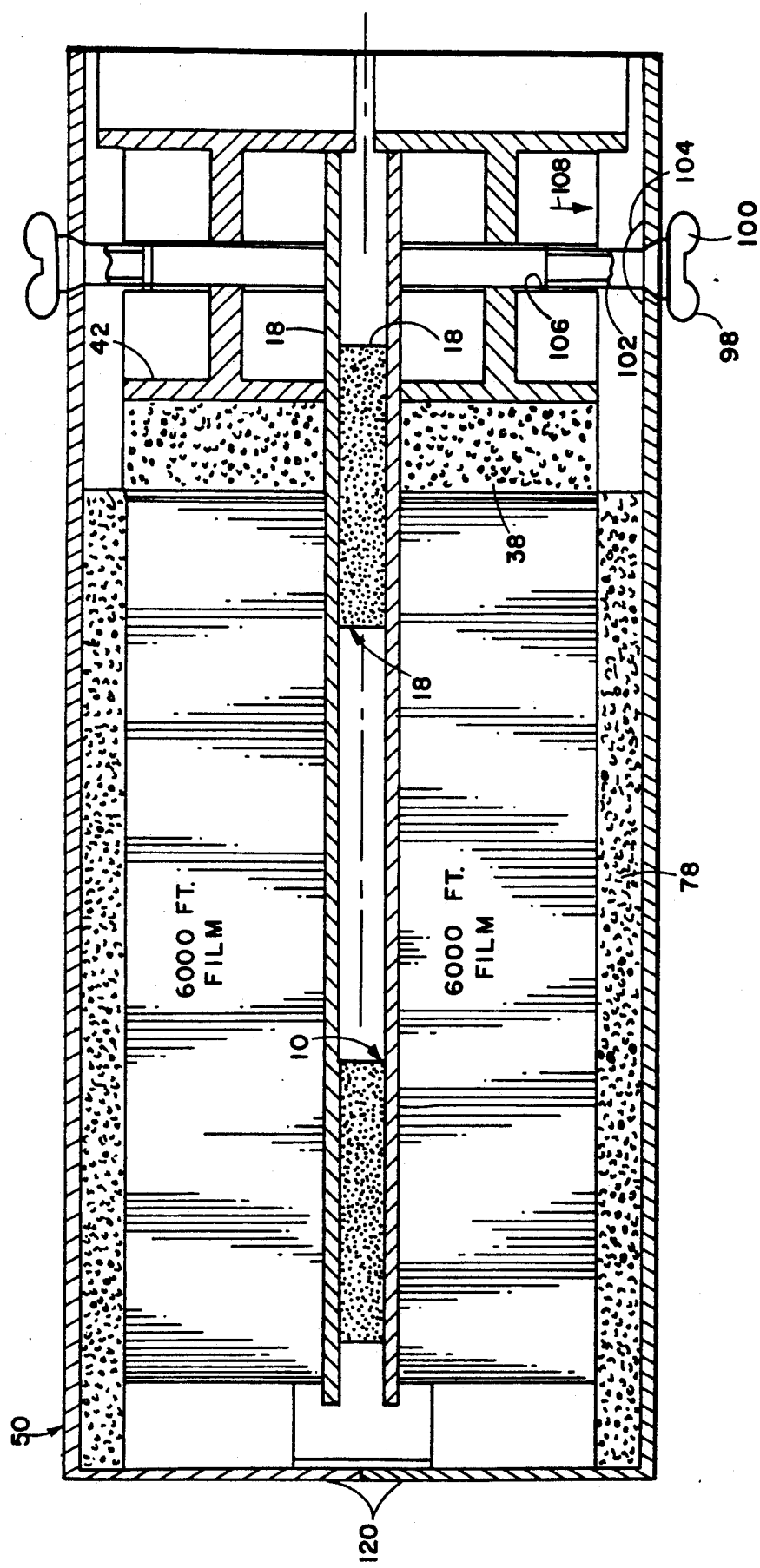
FIG. 5 illustrates a cut away elevational view of a closed case unit having a motion picture film stored therein in two sections.

A case unit 50 is shown in FIGS. 4 and 5. The case unit 50 includes two sections 52 and 54. Each section is one-piece and includes a planar base, such as base 56, having a side wall, such as side wall 58, surrounding the peripheral edge thereof. Each base includes an inner surface, such as surface 60, and an outer surface, such as surface 62. Each side wall has a closure side, such as side 64, and a hinge side, such as side 66, as well as a top and bottom side, such as sides 68 and 70, respectively. While the case unit sections are shown as being quadrilaterals, they could be any other shape as well, including circular, and no limitation is intended by this showing.

A carrying handle, such as handle 72, is attached at each end thereof to the case unit side wall, and has a length defined between the two handle ends. The handles can be used as shoulder straps if desired, and each handle includes a length adjusting element, such as element 74, and one of the handles includes a hand/shoulder pad 76 attached thereto. The pad 76 encircles the other handle to keep the handles together for easy carrying of the case unit, and includes releasable fastening means, such as hook-and-loop fastening means 77, thereon.

Each of the case unit sections includes a film mounting means for mounting motion picture film to the base of each section. The film mounting means includes a plurality of triangular support packing elements 78 extending from the side wall inwardly towards the center of the case unit section. Each of the packing elements includes an outer end 80 adjacent to the side wall, and an inner end 82 located adjacent to the center of the case unit section. The packing elements are machine rubber or like material and serve to engage and support the film when the film is located in the case unit section. While the packing elements are shown as being triangular, they can also be circular as well to form a ring or an annular ring centered on the case unit section center and can have an outer perimeter in contact with the side wall. The minimum diameter of the annular packing element will be located where the inner end 82 is shown herein. The case unit sections can each be molded as one piece; therefore, the annular support packing elements also are formed of material that is suitable for such manufacturing process.

The film mounting means further includes a hub engaging element, such as element 84 which is mounted on the case unit section base at the inner end 82 of each packing element. Each of the hub engaging elements is adapted to engage a hub, such as disclosed in the incorporated documents, associated with a motion picture film, and includes a base portion 86 fixed to the case unit base inner surface 60 and extending upwardly therefrom to a top portion 88 that extends essentially parallel to the inner surface 60 inwardly of the packing element inner end 82. The base and top portions preferably are sections of a monolithic element. The monolithic element supports a motion picture film. The top portion includes an alignment or fastener element 83 that is attached to a motion picture film supporting flange via fastener receiving holes 20 to further attach that flange to the case unit. The fasteners most suitable for this function are the Norway bolts discussed in the incorporated documents; however, other elements can be used without departing from the scope of the present disclosure. Either the Norway bolt or the bolt-receiving opening can be located on the top portion 88, with the other element being located on the flange. The flange is located on top of the hub engaging element, rotated until the Norway bolts and holes 20 are properly aligned, then rotated to attach those Norway bolts to the flange and top portion. A forward portion 90 extends from the top portion downwardly toward the base section inner surface, and connects to a U-shaped portion 92 that is located adjacent to the base section inner surface. A distal end portion 94 is connected to the U-shaped portion and extends toward the center of the base portion.

The hub engaging elements contact the main winding hub of the collapsible hubs and hold that hub in place on the base. The case unit sections are molded elements and the hub engaging elements are formed in the molding process.

The film mounting means further includes fasteners, such as fastener 96, that are mounted on the case unit base and are releasably attached to the winding hub to releasably fasten a film carrying unit hub to the case. The fasteners 96 include partial turn fasteners, such as are manufactured by the Dzus corporation. The fasteners include a male connection portion 98 mounted on the case unit base and having a head 100 positioned outside of the case unit. The connection portion 98 further includes a body segment 102 extending through the base portion and surrounded by an O-ring 104. The hub 42 includes a plurality of female connection portions 106, such as a tubular portion, into which the body segment 102 is received when the hub is in the case-mounted position shown in FIG. 5. A cam and cam shoulder are located within the tubular portion and around the body segment and are engaged when the body portion is inserted into the tubular portion, and the body portion rotated about its longitudinal axis. A spring (not shown) biases the male connection portion outwardly of the case unit in a direction indicated in FIG. 5 by arrow 108 so when loosened, the fastener will be biased outwardly of the case. The cam can be located either on the body segment 102 or on the tubular portion 106 with the shoulder being on the other element. The cam action of the engaged cam and shoulder pulls the case unit-mounted male connection element into the hub-mounted female connection portion thereby drawing the film supporting hub to the case unit.

The male connection elements are mounted on the case unit, and the film supporting hub is positioned in the case unit and rotated until the male connection elements are aligned with the female connection element tubular portions. Upon being aligned, the male connection elements will move into the tubular portions so the film supporting hub can be attached to the case unit. When so attached, the case unit section can be moved about separate from the other case unit section. As shown in FIG. 5, the film is interposed between the film supporting flange and the case unit so the film is protected when the case unit sections are separated from each other. The pads 18 are located on the outside surface of the flange.

As shown in FIG. 5, when the case unit is closed with two film supporting units contained therein, the pads of one flange engage the pads of the other flange, and the film segments are supported on the packing elements whereby the film segments are securely supported in the case unit.

A case unit section releasable fastening means releasably connects the case unit sections together. The case unit section releasable fastening means includes a joint means 109, best shown in FIG. 7. The joint means 109 includes a plurality of C-shaped elements, such as element 110 mounted on one of the case unit sections, and a plurality of pin elements, such as pin element 112, mounted on the other case unit section. The pin elements are slidably and releasably received in the C-shaped elements to lock one case unit section to the other case unit section. The C-shaped elements are oriented to capture the pin elements and securely hold them when the case unit is closed with one case unit coincident with the other as shown in FIG. 5. However, once the case unit sections are spread apart as shown in FIG. 4, the pin elements can be easily disengaged from the C-shaped elements to separate the two sections from each other.

The case unit section releasable fastening means further includes latch elements, such as latch element 114 on wall side 64 of one case unit section and a plurality of catch elements, such as catch element 116, on wall side 64 of the other case unit section. The catch elements and the latch elements are spring loaded and releasably engage each other when one case unit section is coincident with the other case unit section as shown in FIG. 5. The engagement of the latch and catch elements locks the case unit sections together. Such locking also prevents separation of the pin elements from the C-shaped elements. A padlock P can also be included.

As shown in FIGS. 4 and 5, the case unit further includes an interlock band 120 mounted on the side wall of one of the case sections. The band 120 is located on the outside of the side wall closure side as well as on the top and bottom sides, of one case unit section to overlap the corresponding closure side, top and bottom sides of the other case unit section so that side wall abuts the side wall of the first mentioned section while the band is located outside of the sections. A lap joint is thus formed between the band and the wall of the other case unit section. This lap joint further seals the case unit.

After the case unit is opened, it can be placed flat on a supporting surface so the flanges are on top with the case unit base portion outer surfaces 62 engaging the supporting surface. The film is thus supported on the base portion. It is noted that one of the flanges in a case unit can be removed while leaving the film in place since the film will be supported on the base by gravity. This removed flange can be used for other shipping and handling functions as desired.

Figure 6:
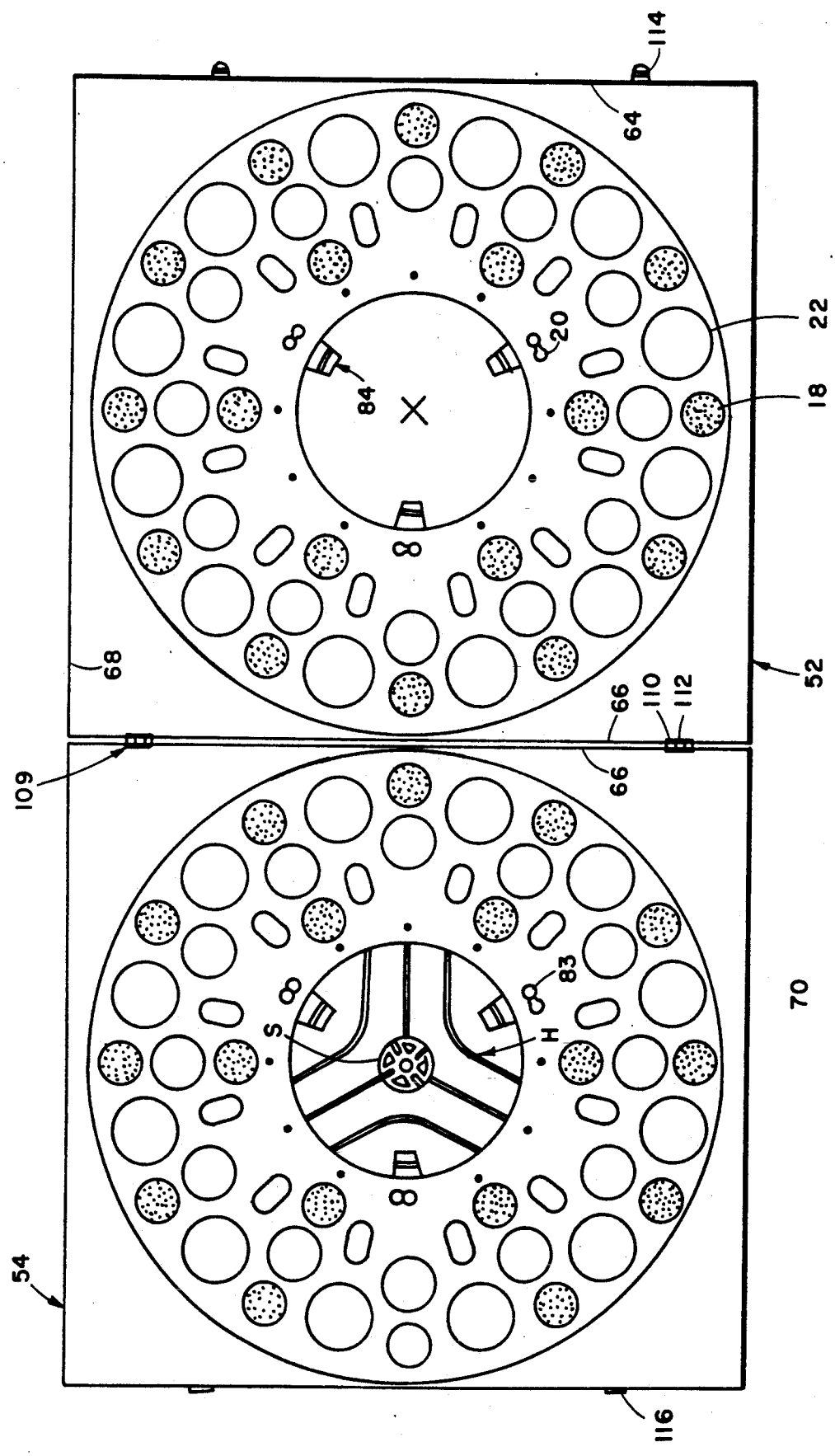
FIG. 6 is a plan view of the shipping and handling case unit of the present invention in the open condition with two different types of film supporting flange systems mounted therein.

In the interest of clarity, the case unit 50 is shown in FIG. 6 in conjunction with film supporting flanges as disclosed in the incorporated documents. A spindle-attaching element S is shown in a center drive hub H in one of the flanges. A motion picture film is shown in section 52 mounted on a flange, but with the hub H omitted.

Figure 7:
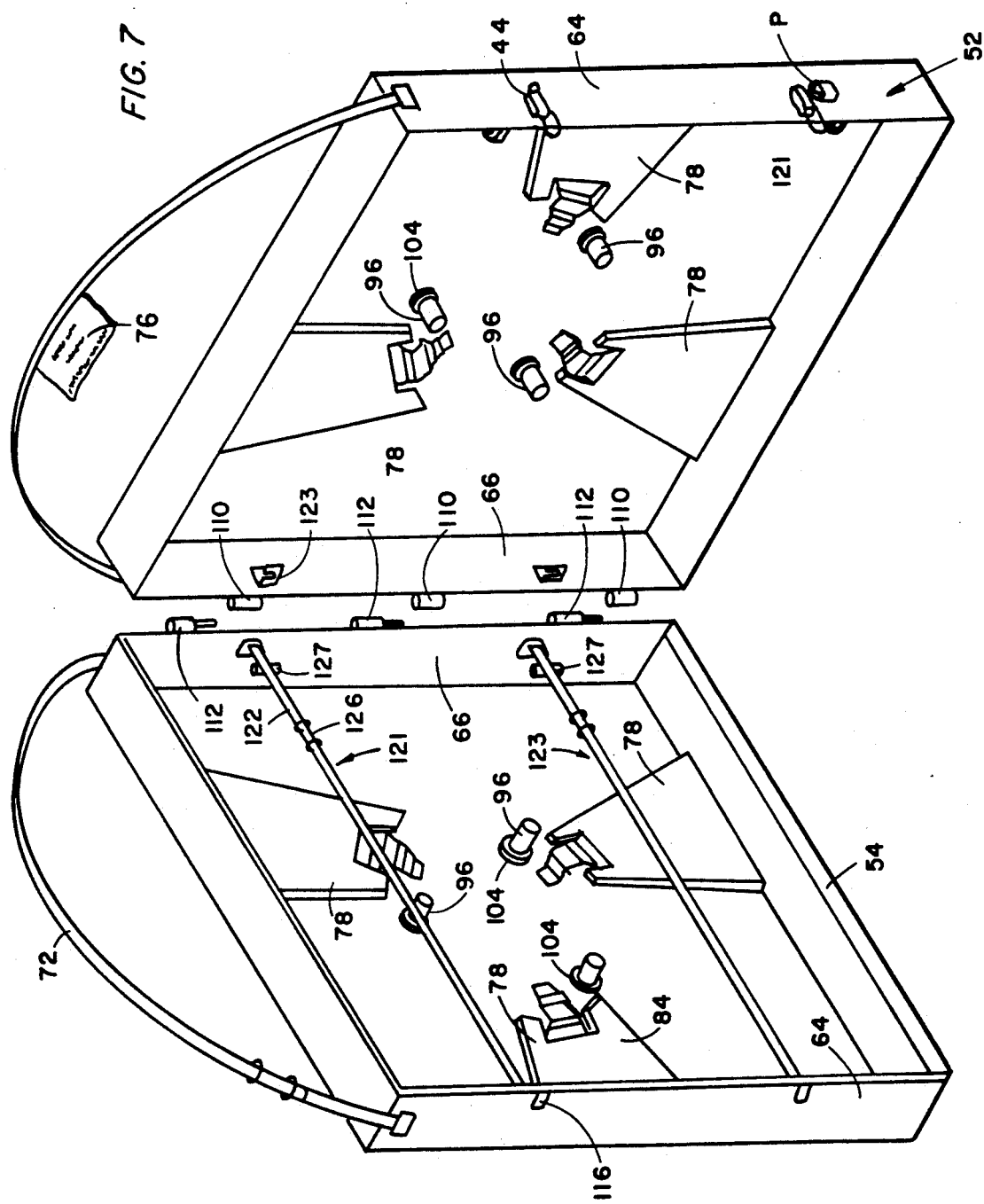
FIG. 7 is a perspective view of the shipping and handling case unit of the present invention in the partially open condition showing film supporting means in a film supporting position.

An alternative form of the case unit is shown in FIG. 7 in which a film engaging means 121 is mounted on the case unit and substitutes for the flanges 10. The film can thus be carried in the case unit without the need of flanges 10. This permits the overall case unit and film combination to be lighter than if flanges are used. The preferred form of the film engaging means includes a plurality of flexible straps, such as strap 122, fixedly mounted on one end thereof to the side wall closure side 64 and being releasably attached at the other end thereof to the side wall hinge side 66. L-shaped mounting brackets 123 are mounted on the side 66 of each case unit section, and the straps are releasably attached to the brackets on the sides 66 and permanently attached to sides 64. Suitable strap permanent fixing means can be included on the sides 64, including brackets identical to the brackets 123. This permits the straps to be removed when not needed or to permit the film flanges and film to be moved into and out of the case unit. The straps can be attached to the flanges on sides 66 by simply threading them into suitable slots on those flanges 123 and knotting the straps around themselves. Other suitable fastening means can be used as well. The flanges are located to space the straps from the base unit bottom and span the case unit sections in position to engage the film on the side thereof that would otherwise be supported on a film supporting flange 10. Each of the straps further includes a length adjusting element 126 and a roll bar 127. When not in use, the straps are simply rolled upon the roll bar 127, and stored in the case unit adjacent to the side wall closure side 64 as indicated in case unit section 52 in FIG. 7. Being flexible, the stored straps do not interfere with the motion picture film being stored in the case unit.

Therefore, as can be understood from the foregoing discussion, motion picture film can be stored and shipped in the case unit of the present invention in various manners, including with the hub, without the hub, with a flange, without a flange, or any combination of the above as will occur to those skilled in the art from the teaching of the present disclosure.

It is understood that while certain forms of the present invention have been illustrated and described herein, it is not to be limited to the specific forms or arrangements of parts described and shown.

I claim:

1. A motion picture film shipping and handling unit comprising:
    A) a case unit which includes
        (1) two sections, each section including
            (a) a base having an inner surface and an outer surface,
            (b) a side wall surrounding said base and having an inner surface adjacent to said base inner surface and an outer surface,
            (c) a carrying handle having ends thereof affixed to said side wall,
            (d) film mounting means for mounting motion picture film to said base, said film mounting means including
                (i) a support packing element mounted on said base inner surface for engaging motion picture film being contained in said case unit,
                (ii) a hub engaging element mounted on said base inner surface adjacent to said support packing element for engaging a hub of a motion picture film, and
                (iii) fasteners mounted on said base for releasably fastening the hub to said base, said fasteners including a female connection portion in the hub, a male connection portion mounted on a case unit base of each case unit section, and a cam on a and cam surface on said male and female connection portions, and
            (e) each case unit section further including a center, said support packing element of each section including an inner portion located adjacent to said case unit section center and an outer portion located adjacent to said side wall; and
    B) case unit fastening means for releasably attaching one case unit section to another case unit section.

2. The motion picture film shipping and handling unit defined in claim 1 wherein said film mounting means includes a plurality of support packing elements on each case unit section base and further hub engaging elements, with each support packing element having a hub engaging element located adjacent thereto.

3. The motion picture film shipping and handling unit defined in claim 2 wherein said case unit fastening means includes a C-shaped section on one case unit section and a pin on the other case unit.

4. The motion picture film shipping and handling unit defined in claim 2 wherein said case unit fastening means further includes a latch element on one case unit section and a catch unit on the other case unit section.

5. The motion picture film shipping and handling unit defined in claim 1 wherein said carrying handle has a length dimension measured between said ends and means for adjusting the length of said carrying handle.

6. The motion picture film shipping and handling unit defined in claim 5 wherein said engaging handle further includes a pad.

7. The motion picture film shipping and handling unit defined in claim 1 further including an interlock band on one case unit section, said interlock band forming a lap joint with the other case unit section when said case unit is closed.

8. The motion picture film shipping and handling unit defined in claim 1 wherein said film mounting means fasteners each includes a partial turn fastening element.

9. The motion picture film shipping and handling unit defined in claim 1 further including a film supporting flange and a plurality of bumper elements on said film supporting flange.

10. The motion picture film shipping and handling unit defined in claim 1 wherein each support packing element is triangular.

11. The motion picture film shipping and handling unit defined in claim 1 wherein said film mounting means hub engaging element includes an alignment element for engaging a bolt-receiving opening in a flange of a motion picture film supporting element.

12. The motion picture film shipping and handling unit defined in claim 11 wherein said alignment element includes a Norway bolt.

13. The motion picture film shipping and handling unit defined in claim 1 wherein said film mounting element engaging element includes a bolt-receiving opening in said hub engaging means and a Norway bolt on a flange of a motion picture film.

14. The motion picture film shipping and handling unit comprising:
   A) a case unit which includes
      (1) two sections, each section including
         (a) a base having an inner surface and an outer surface,
         (b) a side wall surrounding said base and having an inner surface adjacent to said base inner surface and an outer surface,
         (c) a carrying handle having ends thereof affixed to said side wall,
         (d) film mounting means for mounting motion picture film to said base, said film mounting means including
            (i) a support packing element mounted on said base inner surface for engaging motion picture film being contained in said case unit,
            (ii) film engaging means mounted to each of said case unit section side walls and spaced from said support packing element for holding the motion picture film in place in said case unit, and
         (e) each case unit section further including a center, said support packing element of each section including an inner portion located adjacent to a case unit section center and an outer portion located adjacent to said side wall.

15. The motion picture film shipping and handling unit defined in claim 14 wherein said film engaging means includes a flexible strap.

16. The motion picture film shipping and handling unit defined in claim 15 wherein said film engaging means further includes attaching means releasably attaching said flexible strap to said each case unit section.

17. The motion picture film shipping and handling unit defined in claim 16 wherein said film engaging means further includes a length adjusting means on said flexible strap.

18. The motion picture film shipping and handling unit defined in claim 17 wherein said film engaging means further includes a plurality of flexible straps.

19. In combination:
   A) a motion picture film shipping and handling unit including an annular flange, said annular flange having a central opening with an inner diameter, and an outer edge having an outer diameter, a main winding hub having an outer surface with an outer diameter greater than the flange central opening inner diameter, a top surface, a bottom surface, an inner wall connecting said top surface to said bottom surface and having an outer diameter slightly less than said central opening inner diameter, said hub inner wall extending above said hub top surface and below said hub bottom surface, a film winding ring adapted to surround said main winding hub and to be spaced radially apart from said main winding hub, a packing ring sized to be placed between said film winding ring and said main winding hub, said packing ring being formed of flexible packing material, and means for attaching said winding hub to said annular flange; and
   B) a case unit which includes
      (1) two sections, each section including
         (a) a base having an inner surface and an outer surface,
         (b) a side wall surrounding said base and having an inner surface adjacent to said base inner surface and an outer surface,
         (c) a carrying handle having ends thereof affixed to said side wall,
         (d) film mounting means for mounting motion picture film to said base, said film mounting means including
            (i) a support packing element mounted on said base inner surface for engaging motion picture film being contained in said case unit,
            (ii) film engaging means mounted to each of said case unit section side walls and spaced from said support packing element for holding the motion picture film in place in said case unit,
            (iii) a hub engaging element mounted on said base inner surface closely adjacent to said support packing element for engaging said main winding hub, and
            (iv) fasteners mounted on said base for releasably fastening the hub to said base, said fasteners including a female connection portion in the hub, a male connection portion mounted on a case unit base of each case unit section, and a cam and cam surface combination on said male and female connection portions, and
   B) case unit fastening means for releasably attaching one case unit section to another case unit section.

20. In combination:
   A) a film supporting means which includes an annular flange, said flange having a central opening with an inner diameter an outer edge with an outer diameter, an annular main winding hub having an outer surface with an outer diameter greater than the flange central opening inner diameter, fastening means releasably connecting said main winding hub to said flange, a shipping ring mounted on said main winding hub outer surface, an annular film winding ring which surrounds said main winding hub, said film winding ring being resiliently biased towards said main winding hub and having an inner surface and an outer surface, said shipping ring being located between said film winding ring inner surface and said main winding hub outer surface, said shipping ring being movably mounted on said locking ring and said main winding hub to move from a locking position biasing said film winding ring radially outward away from said hub outer surface to an unlocking position permitting said film winding ring to move towards said hub outer surface, spindle engaging means for attaching said film supporting means to a spindle for mounting film on said film supporting means on a reel-type movie projection system, said spindle engaging means including a center hub element located adjacent to said main winding hub central opening and having means for releasably mounting said center hub element to the spindle, and spindle engaging means fastener elements releasably mounting said center hub element to said film supporting means; and B) a case unit for containing said film supporting means and comprising
  (1) two sections, each section including
    (a) a base having an inner surface and an outer surface,
    (b) a side wall surrounding said base and having an inner surface adjacent to said base inner surface and an outer surface,
    (c) a carrying handle having ends thereof affixed to said side wall,
    (d) film mounting means for mounting motion picture film to said base, said film mounting means including
      (i) a support packing element mounted on said base inner surface for engaging motion picture film being contained in said case unit, and
      (ii) film engaging mans mounted to each of said case unit section side walls and spaced from said support packing element
  (2) two sections, each section including
    (a) a base having an inner surface and an outer surface,
    (b) a side wall surrounding said base and having an inner surface adjacent to said base inner surface and an outer surface,
    (c) a carrying handle having ends thereof affixed to said case unit side wall,
    (d) releasable fasteners mounted on said base, and
    (e) fastening means for releasably connecting one case unit section to another case unit section, said fastening means including
      (i) a female connection portion in said main winding hub,
      (ii) a male connection portion mounted on a case unit base of each case unit section, and
      (iii) a cam and cam surface combination on said male and female connection portions, and
    (f) joint means for releasably attaching one case unit section to another case unit section.

* * * * *